Sept. 16, 1924.
C. DUEKER
1,508,650
WHEEL SCRAPER FOR LAND VEHICLES
Filed Oct. 28, 1920
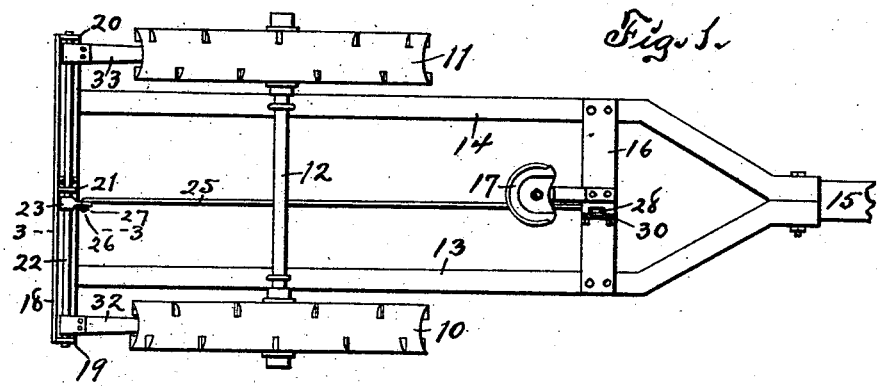
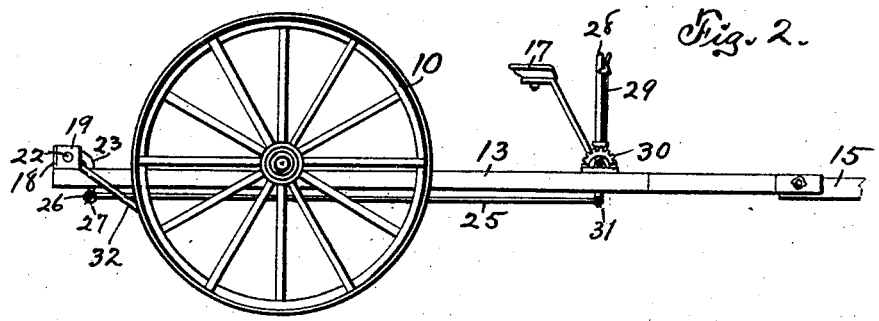
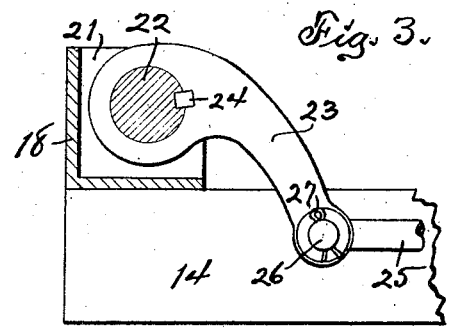
Inventor:
Carl Dueker
By Silas L. Sweet, Atty Patented Sept. 16, 1924.

1,508,050

UNITED STATES PATENT OFFICE.

CARL DUEKER, OF COOPER TOWNSHIP, WEBSTER COUNTY, IOWA.

WHEEL SCRAPER FOR LAND VEHICLES.

Application filed October 28, 1920. Serial No. 420,086.

*To all whom it may concern:*

Be it known that I, CARL DUEKER, a citizen of the United States of America, and resident of Cooper Township, Webster County, Iowa, have invented a new and useful Wheel Scraper for Land Vehicles, of which the following is a specification.

An object of this invention is to provide improved means for cleaning the supporting or traction wheels of a land vehicle.

A further object of this invention is to provide an improved construction for a wheel-scraper.

My invention consists in the construction, arrangement and combination of elements hereinafter set forth, pointed out in my claim and illustrated by the accompanying drawing, in which—

Figure 1 is a plan and Figure 2 a side elevation of a land vehicle embodying my invention. Figure 3 is a vertical section, on an enlarged scale, on the indicated line 3—3 of Figure 1.

In the construction of the devices as shown the numerals 10, 11 designate supporting wheels, also arranged for traction, and adapted to support an axle 12. Beams 13, 14 are carried by and extend across the axle 12 and are adapted to be connected at their forward ends by a tongue or pole 15. A cross-bar 16 is mounted on and extends across the forward portions of the beams 13, 14 and a driver's seat 17 is carried by and above said cross-bar. An angle-bar 18 is mounted on and extends across and projects at its ends beyond the rear end portions of the beams 13, 14. The angle-bar preferably is arranged with its vertical flange at the rear of and extending upwardly from its horizontal flange and end portions of said bar extend across the lines of travel of the wheels 10, 11 and are at the rear of said wheels. Bearings 19, 20 are formed by bending end portions of the horizontal flange of the angle-bar 18 at right angles into parallel planes alongside of end portions of the vertical flange thereof, which bent portions are formed with registering holes. A bearing block 21, formed of an angle plate, is mounted on the central portion of the angle-bar 18 and is provided with a hole registering with the holes in the bent end portions of said bar. A rock-shaft 22 is journaled in the holes of the bent end portions or bearings 19, 20 and block 21. A crank-arm 23 is mounted on the central portion of the rock-shaft 22 and is formed with an apertured hub receiving said shaft, said hub and shaft being formed with registering key-ways adapted to receive a key 23 to secure them together. The crank-arm 23 is curved between its ends and extends forwardly and downwardly from the rock-shaft between the beams 13, 14. The crank-arm 23 is formed with a hole in its outer end and a draft-rod 25 has one end portion 26 bent at right angles to its body and extended through said hole and secured therein by a cotter 27. A hand-lever 28 is fulcrumed on the cross-bar 16 and is provided with detent devices 29 adapted to engage a toothed segment 30 carried by the cross-bar. A hole is formed in the lower end portion of the hand-lever 28 and the forward end portion of the draft-rod 25 is bent laterally, extends through said hole and is secured therein by a cotter 31. Scraper blades 32, 33 are fixed at one end each to end portions of the rock-shaft 22 adjacent to the bearings 19, 20, and between said bearings, and said blades extend forwardly and downwardly across the outer sides of the beams 13, 14 in the paths of travel and at the rear of the wheels 10, 11. Thus the scraper-blades 32, 33 are at all times in inclined positions.

In practical use, the lever 28 is manipulated to adjust the scraper-blades 32, 33 into different positions. In one such position the scraper-blades function to clean the wheels by close relation of the forward ends thereof with the rims of the wheels. The blades 32, 33 are slightly tapering and the ends thereof may engage and slide on the rims of the wheels between rows of traction lugs thereon, and the inclined positions of the blades causes them to apply a wedge force to accumulations of mud and trash on said rims and remove them.

I claim as my invention—

In a land vehicle having a frame and wheels supporting the same, an angle bar forming the rear end of said frame and projecting at its ends beyond the frame and across the paths of the wheels, bearings mounted in end portions of said angle bar, a bearing mounted in the central portion of said angle bar, a rock shaft journaled in said bearings, an arm fixed to and extending forwardly and downwardly from said rock shaft, draft means attached to said arm, and scraper blades fixed to said rock shaft between the outermost bearings and the sides of the frame and extending forwardly and downwardly at the rear of and into proximity with said wheels, said blades lying wholly to the rear of the wheels and normally depending out of contact with the rims thereof.

Signed at Fort Dodge, in the county of Webster and State of Iowa, this 22 day of October, 1920.

CARL DUEKER.